Sept. 14, 1954

W. S. MELVILLE 2,689,311

PULSE GENERATING CIRCUIT

Filed Sept. 15, 1952

4 Sheets-Sheet 1

Inventor:
William S. Melville,
by Bowell S. Mack
His Attorney.

Sept. 14, 1954 W. S. MELVILLE 2,689,311

PULSE GENERATING CIRCUIT

Filed Sept. 15, 1952 4 Sheets-Sheet 2

Inventor:
William S. Melville,
by Browell & Mack
His Attorney.

Sept. 14, 1954 W. S. MELVILLE 2,689,311

PULSE GENERATING CIRCUIT

Filed Sept. 15, 1952 4 Sheets-Sheet 3

Inventor:
William S. Melville,
by Brunell S. Mack
His Attorney.

Sept. 14, 1954 W. S. MELVILLE 2,689,311

PULSE GENERATING CIRCUIT

Filed Sept. 15, 1952 4 Sheets-Sheet 4

Inventor:
William S. Melville,
by Prowell S. Mack
His Attorney.

Patented Sept. 14, 1954

2,689,311

UNITED STATES PATENT OFFICE 2,689,311

PULSE GENERATING CIRCUIT

William S. Melville, Rugby, England, assignor to The British Thomson-Houston Company Limited, a British company Application September 15, 1952, Serial No. 309,605

Claims priority, application Great Britain September 14, 1951

14 Claims. (Cl. 307—108)

My invention relates to novel pulse generating circuits, and it has for one of its objects the production of recurrent pulses of high peak voltage and short duration.

Another object of my invention is to provide a novel pulse generating circuit which is simple to construct and yet is entirely efficient in operation.

A pulse generating circuit constructed in accordance with the present invention comprises an energy-storage circuit and a saturable capacitor. This capacitor is coupled to the energy-storage circuit and has a capacitance value which varies abruptly in response to a predetermined energy condition in the energy-storage circuit. Energy is supplied to the energy-storage circuit and means are provided for deriving an energy pulse from the energy-storage circuit in response to a change in capacitance value of the saturable capacitor.

In accordance with a modification of the invention, a polarizing voltage is applied to the saturable capacitor. In this way unidirectional, rather than bidirectional, output pulses may be derived.

In another modification of the invention a plurality of sections each including an inductor and a saturable capacitor are connected in cascade. Thus, pulses of shorter duration than in the above arrangements may be obtained.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings, in which:

Figures 1, 2, 3, 4, 5:
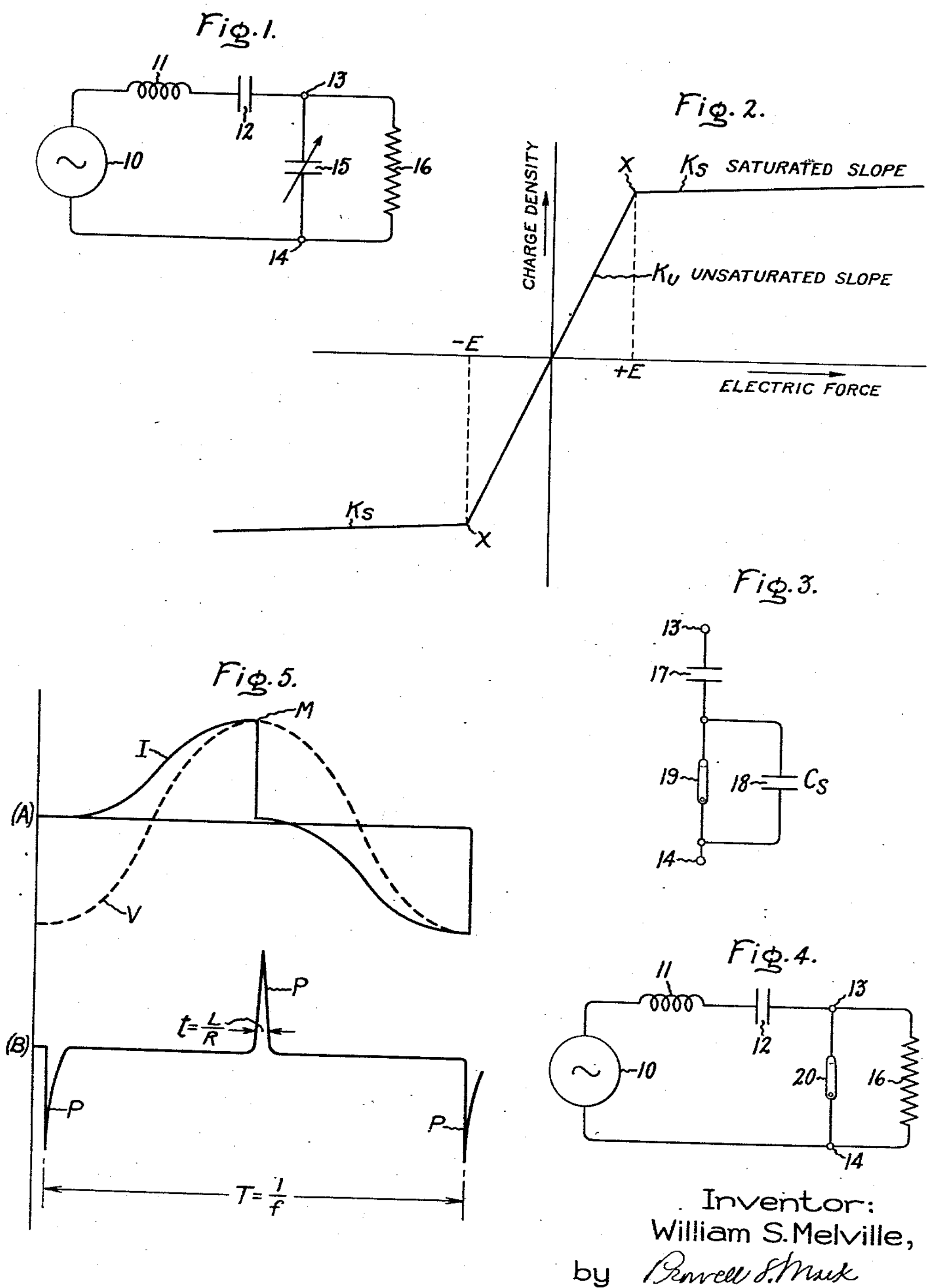
Fig. 1 is a schematic diagram of a pulse generating circuit embodying the present invention.
Fig. 2 represents an operating characteristic of a portion of the circuit shown in Fig. 1.
Figs. 3 and 4 are simplified diagrams of the circuit shown in Fig. 1, useful in explaining the operation thereof.
Fig. 5 represents various operating characteristics of the circuits illustrated in Figs. 1 and 4.

In Fig. 1 of the drawings, the pulse generating circuit embodying the present invention is shown to include a source of undulating potential 10, such as an oscillation generator, having one of its terminals connected through the series combination of an inductor 11 and a capacitor 12 to a terminal 13. The remaining terminal of source 10 is connected to another terminal 14, and a saturable capacitor 15 and a load impedance 16 are connected in parallel and to terminals 13 and 14.

Source 10 provides a sinusoidal driving potential of a predetermined frequency which, as will be later shown, determines the repetition frequency for pulses derived at load 16 that is preferably of substantially resistive impedance. Inductor 11 and capacitor 12 are resonant at this predetermined frequency, i. e., $$\omega \doteq \sqrt{\frac{1}{LC}}$$

where $\omega = 2\pi$ times the operating frequency, L is the inductance of inductor 11 and C is the capacitance of capacitor 12. Elements 11 and 12 are included in an energy-storage circuit and, as will be described hereinafter, capacitor 15 by reason of its saturable characteristic operates as a switch so as to cause the storage circuit to discharge periodically through load 16 and thereby generate energy pulses.

In order to operate as a saturable capacitor, capacitor 15 preferably includes dielectric material comprised of single crystals of barium titanate, polarized along preferred crystal axes. This material normally has a very high dielectric constant, particularly at certain temperatures, and exhibits two states, one in which the dielectric constant is high when unsaturated, and the other in which the dielectric constant is low when saturated. The change from one state to the other takes place at high charge density for a small change in charge density.

An example of such a characteristic is shown by the curve of Fig. 2. In this figure, electric force is plotted as abscissae and charge density is plotted as ordinates. It will be observed that over a range, $K_u$, of small values of electric force, the resulting charge density varies linearly. This is the normal or unsaturated portion of the operating range.

With an increase of electric force to values of pus or minus E, saturation of the dielectric material takes place and the slope of the characteristic curve abruptly decreases at points X. For values of electric force greater than plus or minus E, the charge density varies essentially linearly, but at a substantially lower rate than over the range between these values, as illustrated by curve portions $K_s$ which join $K_u$ at points X. The portions $K_s$ represent the saturated slope of the characteristic curve for the dielectric material.

A capacitor constructed of the dielectric material just described thus has a very high normal capacitance, but in the saturated state of the dielectric the capacitance is very low. Accordingly, in an alternating current circuit, the unsaturated impedance of the capacitor is very low, while its saturated impedance is very high.

The operation of the system of Fig. 1 may be explained by reference to Fig. 3, in which the unsaturated capacitance of capacitor 15 is represented by a first condenser 17 connected in series circuit relation with a second condenser 18 between terminals 13 and 14. Capacitor 18 represents the saturated capacitance of capacitor 15, and it is shunted by a switch 19. The change in condition of the dielectric of capacitor 15 from the unsaturated to the saturated state and vice versa is thus simulated by the opening and closing, respectively, of switch 19.

The transition between the two states is assumed to take place instantaneously, at a value of charge density in the dielectric material which is determined by the characteristics thereof. Although in practical single-crystal barium titanate dielectrics, a finite change in charge density is required to produce a change from the unsaturated to the saturated state, by suitably selecting the circuit parameters this can be arranged to have negligible effect on the operation of a circuit incorporating a bi-valued saturable capacitor.

Since the slope of the characteristic curve for the dielectric of capacitor 15 is much lower in the saturated condition than in the unsaturated state, capacitor 17 which represents the unsaturated capacitance of capacitor 15, has a much greater capacitance value than capacitor 18, representing the saturated capacitance. Consequently, series capacitor 17 is of very small impedance and shunt capactor 18 is of very large impedance and the circuit of Fig. 3 (condenser 15 of Fig. 1) may be represented, as far as function is concerned, by a simple switch 20, shown in Fig. 4. In the latter figure, switch 20 is assumed to be a perfect switch, i. e., its closed circuit impedance is zero, while its open circuit impedance is infinite.

The operation of the circuit shown in Fig. 4 may best be understood by reference to Figs. 5A and B which illustrate the instantaneous voltage and current in the circuit, and the derived energy pulses, respectively, plotted to a common time scale.

The dash-curve V in Fig. 5A denotes the sinusoidal voltage provided by source 10. Switch 20 remains closed during the period in which inductance 11 charges and the current therein varies in a manner denoted by curve I. At the time the current in inductor 11 increases to a maximum value, point M on curve I, switch 20 is opened instantaneously and the current stored in the inductor flows into resistive load 16. As a result, the voltage increases in the load to a peak value corresponding to the peak current multiplied by the load resistance. Thereafter, the voltage and current decrease exponentially according to the time constant $t$ which is equal to $L/R$, where L is the inductance of inductor 11 and R is the resistance of load 16.

By suitably apportioning the circuit parameters, pulses of very high peak voltage and of short duration, represented by pulses P in Fig. 5B, may be obtained. Switch 20 closes for both positive and negative current maxima in inductor 11 and thus the output pulses developed at load 16 are bi-phasal, i. e., positive and negative pulses are produced.

Inasmuch as capacitor 15 of Fig. 1 is of the saturable type and thus is bi-stable in its capacitance value, it operates in the same manner as switching device 20 of Fig. 4. That is to say, its high unsaturated capacitance acts as a closed switch of low impedance and its low saturated capacitance acts as an open switch of high impedance. The change in capacitance, of course, occurs instantaneously and automatically at a predetermined current level, such as point M along curve I of Fig. 5A. Accordingly, the operation of the circuit of Fig. 1 is the same as described in connection with Fig. 4 and the pulses P of Fig. 5B are derived at load 16.

For efficient operation of the circuit constructed in accordance with the present invention, it is preferred that condenser 15 be appropriately designed and materials be chosen to meet the following conditions:

A. The unsaturated impedance of capacitor 15 is much less than the resistive impedance of load 16 during charging of inductor 11.

B. The unsaturated capacitance of capacitor 15 is greater than the capacitance of capacitor 12 during charging of inductor 11.

C. The saturated capacitance of capacitor 15 is equal to or less than $L/4R^2$, where L is the inductance of inductor 11 and R is the resistive impedance of load 16.

D. Saturable capacitor 15 saturates at current maximum (point M on curve I of Fig. 5A) in inductor 11.

A utilization circuit may be directly connected to the pulse generating circuit or may be coupled thereto by means of a pulse transformer.

In installations wherein the bi-phasal output pulses of the circuit shown in Fig. 1 are not suitable, the output may be rectified to produce unidirectional pulses. Alternatively, a transformer with two secondaries may be used to feed two rectifiers. In the latter circuit, the saturable capacitor may be polarized to adjust the relative phasing of the pulses. This may be accomplished, for example, by connecting a source of biasing voltage in series with a D. C. isolating capacitor across capacitor 15.

Figure 6:
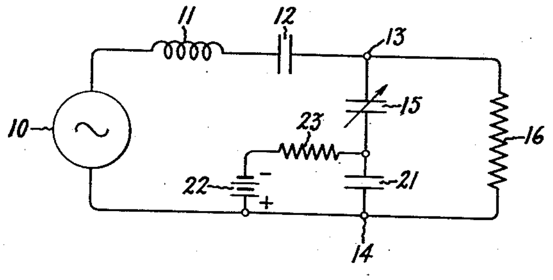
Fig. 6 illustrates a modification of the circuit shown in Fig. 1.

In Fig. 6 of the drawing, there is shown a circuit diagram of a pulse generating circuit constructed in accordance with a modification of the present invention in which a polarizing voltage is applied to the saturable capacitor. In this way, there is provided a single phase output for deriving unidirectional pulses.

Various elements in the circuit of Fig. 6 are identical with certain elements illustrated in Fig. 1 and are designated by the same reference characters. The circuits are essentially similar. However, a bypass capacitor 21 is connected in series between saturable capacitor 15 and terminal 14 and the positive terminal of a polarizing battery 22 is connected to terminal 14. The negative terminal of the battery is connected via a decoupling resistor 23 to the junction of capacitors 15 and 21.

Figure 7:
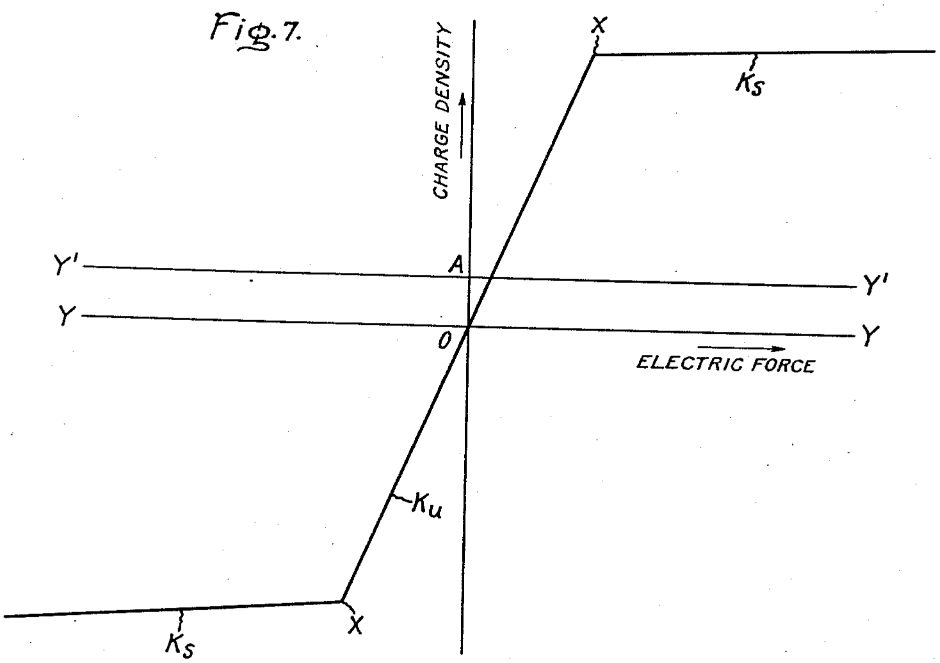
Figs. 7 and 8 represent various operating characteristics of the circuit shown in Fig. 6.

The effect of the polarizing voltage upon saturable capacitor 15 may best be appreciated by reference to Fig. 7 which, like Fig. 2, is a plot of electric force versus charge density for the non-linear dielectric material of the capacitor. It may be observed that by subjecting the dielectric to a unidirectional polarizing force, the mean charge is displaced with respect to the zero axis YOY of charge. The amount of charge polarization is represented by the distance OA and the resulting charge axis is Y'AY'. By so polarizing the dielectric, a charge density waveform that is symmetrical about Y'AY' is made to pass only the upper one of knees X of curve $K_sK_uK_s$ and does not reach the other knee. For purposes of emphasis, Figures 2 and 7 show a sharp transition in the characteristic curve when passing from one state to another at points X. In practice it is merely necessary that the materials employed are capable of a transition which is sufficiently abrupt or relatively sharp to develop a spike of voltage across the load circuit.

Figure 8:
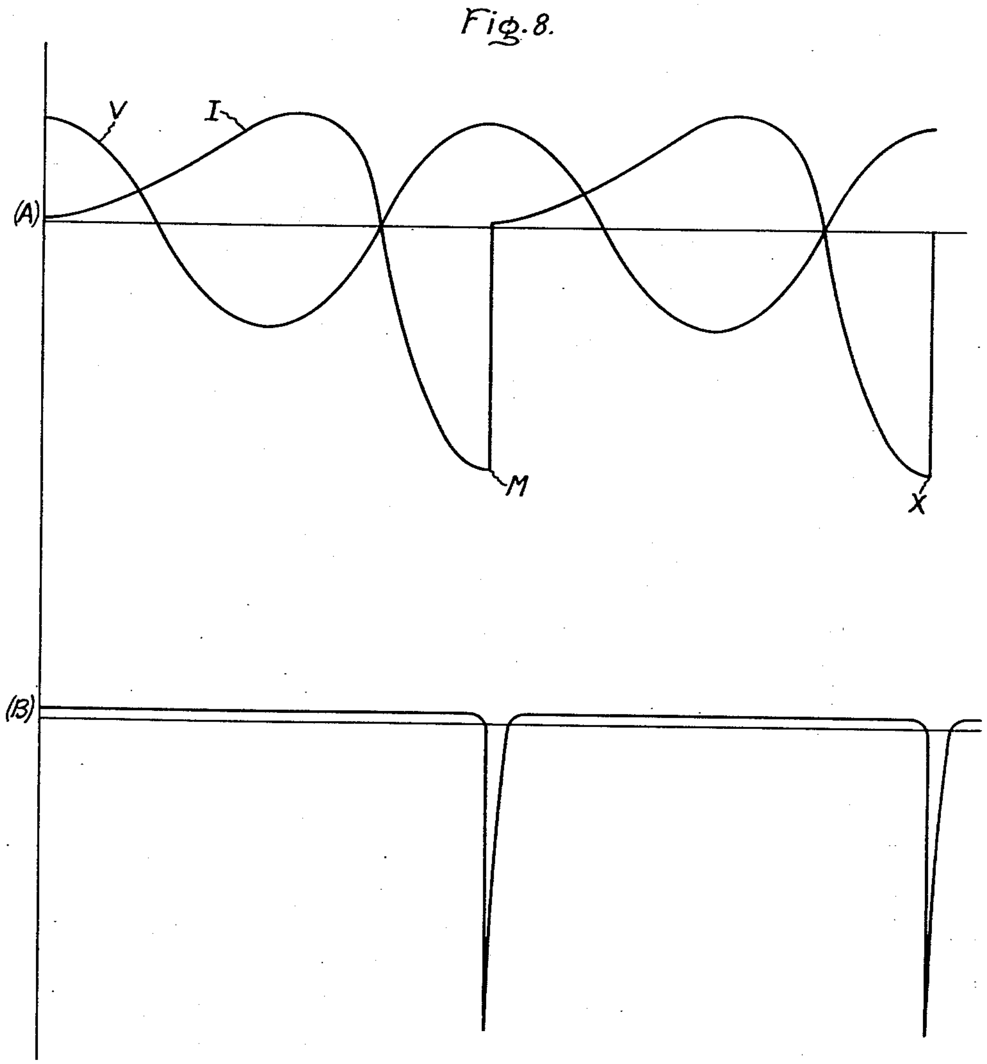

In Fig. 8, the applied voltage V and charging current I into inductance 11 are plotted to a common time scale. When capacitor 15 is unsaturated and has a very low impedance, the current builds up as determined by resonant circuit 11, 12. Because of the polarizing charge, the maximum charge density of capacitor 15 in one direction is reached and passed without the capacitor becoming saturated. Before the maximum charge density is reached in the opposite direction, however, saturable capacitor 15 saturates (at point M of curve I) and effectively becomes a high impedance; the current stored in inductor 11 discharges into the utilization circuit 16. Thus, a high voltage pulse is developed in the utilization circuit. The current and voltage decrease exponentially according to the time constant of the circuit including inductor 11 and resistive impedance 16. The derived pulses occur once per cycle of wave V and are unidirectional, as shown in Fig. 5B.

It has been found that capacitor 12 should be linear and preferably have a high capacitance compared with the unsaturated capacitance of capacitor 12. Moreover, decoupling resistor 23 should be of high impedance. Alternatively, an inductor of high impedance may be used for decoupling purposes.

As an alternative to the arrangement for applying a polarizing voltage illustrated in Fig. 6, the polarizing voltage may be applied to any arm of the discharge circuit or directly across the saturable capacitor itself. In the latter case, suitable decoupling elements should be employed.

Figure 9:
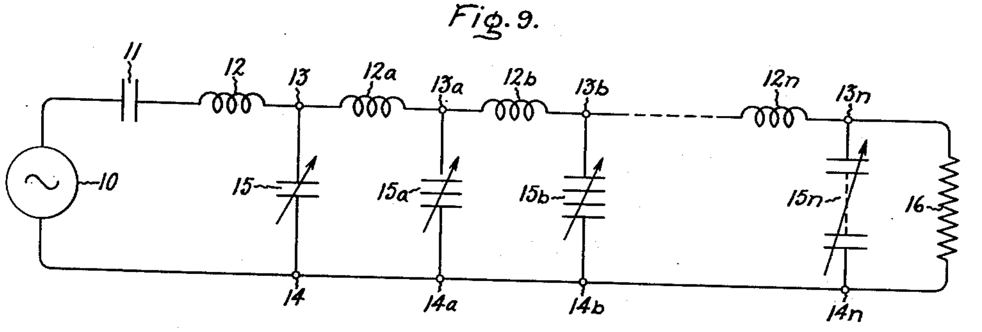
Fig. 9 is a circuit diagram illustrating another modification of the invention.

In order to derive pulses of shorter duration than produced by the circuits described hereinbefore, another embodiment of the present invention may be employed. In this embodiment, a plurality of saturable capacitors are connected in cascade as switching elements, as shown in Fig. 9.

As in Fig. 1, a source of alternating potential 10 is connected through the series combination of a capacitor 11 and an inductor 12 to a terminal 13 and directly to a terminal 14. A saturable capacitor 15 is connected in parallel with terminals 13 and 14. However, a plurality of impedance sections are interposed between terminals 13—14 and resistive load impedance 16. Each section comprises an inductor and a saturable capacitor connected to the terminals 13—14 of the preceding saturable capacitor. Inductors 12a, 12b . . . 12n are of equal inductance values and saturable capacitors 15a, 15b . . . 15n have relative values and characteristics which are determined as follows.

It has been found that the characteristic of each of the saturable capacitors should be such that the ratio of the unsaturated value of capacitance to the saturated value of capacitance preferably is equal to or greater than 400, or $$\frac{C15_u}{C15_s}=\frac{C15a_u}{C15a_s}=\frac{C15b_u}{C15b_s}\cdots=\frac{C15n_u}{C15n_s}\geqq 400 \quad (1)$$

where $C_u$ represents the unsaturated capacitance value and $C_s$ the saturated capacitance value of the respective saturable capacitors. Furthermore, the capacitance values of the saturable capacitors preferably should be such that $$\frac{C15u}{C15a_u}=\frac{C15a_u}{C15b_u}=\frac{C15b_u}{C15c_u}\cdots=\frac{C15(n-1)_u}{C15n}\geqq 20 \quad (2)$$

and $$\frac{C15a_u}{C15s}=\frac{C15b_u}{C15a_s}=\frac{C15c_u}{C15b_s}\cdots=\frac{C15n_u}{C15(n-1)_s}\geqq 20 \quad (3)$$

Figure 10:
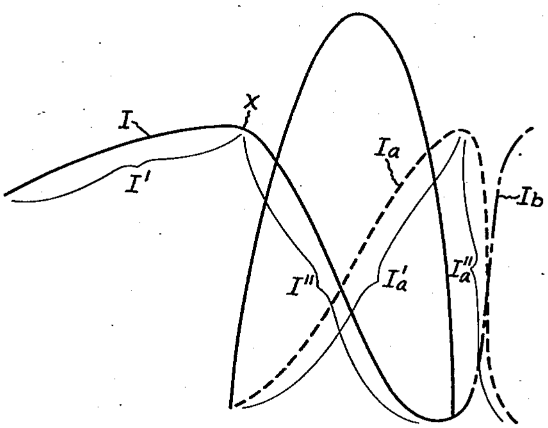
Fig. 10 represents various operating characteristics of the circuit shown in Fig. 9.

The operation of the circuit shown in Fig. 9 may be best understood by reference to Fig. 10 in which various curves representing potential and currents in the circuit are plotted to a common time scale. In this figure, curve E represents the voltage on saturable capacitor 15, and curve I represents the current flowing in inductor 12. The portion of this latter curve designated I' denotes the charging current for inductor 12, and portion I'', the discharging current. Similarly, portions Ia' and Ia'' of curve Ia represent the charging and discharging current for inductor 12a. Dash-dot curve Ib represents the current flowing in indicator 12b.

Initially capacitor 15 is unsaturated and offers a very low impedance so that current builds up in inductor 12 according to the values of inductor 12 and capacitor 11, which are arranged to be resonant at the supply frequency.

Saturable capacitor 15 is designed to saturate at current maximum in inductor 12, represented by point X of curve I. In this state, the capacitance of capacitor 15 is very low. The saturated capacitance of condenser 15 preferably is much smaller than the unsaturated capacitance of condenser 15a. Hence, the natural period of discharge for the current from inductor 12 and the period $t$ of the charging current into inductor 12a may be expressed as follows:

$$t=2\pi\sqrt{\frac{(L12)(L12a)}{L12+L12a}C15_s)} \quad (4)$$

Moreover, because inductors 12, 12a, 12b, etc. are of equal inductance, the duration $t_1$ of discharge of inductor 12, or of charge of inductor 12a is $$t_1=\pi\sqrt{\frac{(L12)(C15_s)}{2}} \quad (5)$$

If saturable capacitor 15a is designed to saturate at the point of maximum charge of inductor 12a, the current in inductor 12a discharges into inductor 12b during time $t_2$, which may be defined as:

$$t_2=\pi\sqrt{\frac{(L12)(C15a_s)}{2}} \quad (6)$$

By dividing the Equation 5 by this Equation 6, the following ratio is obtained:

$$\frac{t_1}{t_2}=\sqrt{\frac{C15_s}{C15a_s}} \quad (7)$$

In considering the operation of the circuit of Fig. 1 it is assumed, for example, that $$\frac{C_u}{C_s}=1000$$

for each saturable capacitor, that $$\frac{C15_u}{C15a_u}=31$$

and that $$\frac{C15a_u}{C15_s}=31$$

Therefore, $$\frac{t_1}{t_2}\doteq\sqrt{31}\doteq 5.6 \quad (8)$$

and $$\frac{t_2}{t_3}=\frac{t_3}{t_4}\ \ldots\ \frac{tn-1}{tn}\doteq 5.6 \quad (9)$$

In other words, by adding stages, or sections, of inductance and saturable capacitance, the charging time can be reduced until the saturated capacity of capacitor 15$n$ is small enough to allow the stored energy to be dissipated in load 16 in a single unidirectional pulse, i. e. when $$Cn_s \leq \frac{L}{4R^2} \quad (10)$$

Thus, high amplitude pulses of extremely short duration are derived in load 16.

While particular embodiments of the present invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What I claim as new and desire to secure by Letters Patent of the United States is:

1. In combination, an energy-storage circuit, a saturable capacitor coupled to said energy-storage circuit and having a dielectric which saturates abruptly in response to a predetermined energy condition in said energy-storage circuit, means for applying energy to be stored in said energy-storage circuit, and means for deriving an energy pulse from said energy-storage circuit in response to a change in dielectric value of said capacitor.

2. In combination with a source of energy of varying magnitude, an energy-storage circuit coupled to said source, a saturable capacitor connected in series circuit relation with said energy-storage circuit and said source and having a dielectric which saturates abruptly in response to a predetermined energy condition in said energy-storage circuit, and means for deriving an energy pulse from said energy-storage circuit in response to a change in dielectric value of said capacitor.

3. In combination, an energy-storage circuit, a capacitor coupled to said energy-storage circuit and comprising a single-crystal dielectric material having an electric force versus charge density characteristic curve including a sharp transition, said capacitor thereby having a capacitance value variable abruptly in response to a predetermined energy condition in said energy-storage circuit, means for applying energy to be stored in said energy-storage circuit, and means for deriving an energy pulse from said energy-storage circuit in response to a change in capacitance value of said capacitor.

4. In combination, an energy-storage circuit, a capacitor coupled to said energy-storage circuit and comprising a single crystal dielectric material of barium titanate polarized along preferred crystal axes having an electric force versus charge density characteristic curve including a sharp transition, said capacitor thereby having a capacitance value variable abruptly in response to a pre-determined energy condition in said energy-storage circuit, means for applying energy to be stored in said energy-storage circuit, and means for deriving an energy pulse from said energy-storage circuit in response to a change in capacitance value of said capacitor.

5. In combination with a source of undulating potential having a given frequency, an energy-storage circuit coupled to said source and including a first capacitor and an inductor connected in series circuit relation and resonant at said given frequency, a second, saturable, capacitor connected in series circuit relation with said energy-storage circuit and said source and having a capacitance value variable abruptly in response to a predetermined energy condition in said energy-storage circuit, and means for deriving an energy pulse from said energy-storage circuit in response to a change in capacitance of said capacitor.

6. In combination with a source of energy of varying magnitude, an energy-storage circuit coupled to said source, a capacitor connected in series circuit relation with said energy-storage circuit and said source and having a capacitance value variable abruptly in response to a predetermined energy condition in said energy-storage circuit, and a load impedance coupled in parallel circuit relation with said capacitor for deriving an energy pulse from said energy-storage circuit in response to a change in capacitance of said capacitor.

7. In combination, an energy-storage circuit, a capacitor coupled to said energy-storage circuit and having a capacitance value variable abruptly in response to a predetermined energy condition in said energy-storage circuit, means for applying energy to be stored in said energy-storage circuit, means for applying a polarizing voltage to said capacitor, and means for deriving an energy pulse from said energy-storage circuit in response to a change in capacitance value of said capacitor.

8. In combination with a source of energy of varying magnitude, an energy-storage circuit coupled to said source, a capacitor connected in series circuit relation with said energy-storage circuit and said source and having a capacitance value variable abruptly in response to a predetermined energy condition in said energy-storage circuit, another capacitor connected in series circuit relation with said first-mentioned capacitor, an impedance having a high resistance value connected to one terminal of said other condenser, a source of polarizing voltage connected to said impedance and to the remaining terminal of said other condenser, and means for deriving an energy pulse from said energy storage circuit in response to a change in capacitance of said capacitor.

9. In combination, a source of energy of varying magnitude, a fixed capacitor of substantially constant capacitance value, a first inductor, a first saturable capacitor connected in series circuit relation with said source, said fixed capacitor, and said first inductor, a second inductor, a second saturable capacitor connected in series circuit relation with said first saturable capacitor and said second inductor, and a load impedance coupled to said second saturable capacitor for deriving energy pulses.

10. In combination, a source of energy of varying magnitude, a fixed capacitor of substantially constant capacitance value, a first inductor, a first saturable capacitor connected in series circuit relation with said source, said fixed capacitor, and said first inductor, a second inductor, a second saturable capacitor connected in series circuit relation with said first saturable capacitor and said second inductor, each of said first and second saturable capacitors having a ratio of unsaturated capacitance value preferably to saturated capacitance value at least equal to 400, and a load impedance coupled to said second saturable capacitor for deriving energy pulses.

11. In combination, a source of energy of varying magnitude, a fixed capacitor of substantially constant capacitance value, a first inductor, a first saturable capacitor connected in series circuit relation with said source, said fixed capacitor, and said first inductor, a second inductor, a second saturable capacitor connected in series circuit relation with said first saturable capacitor and said second inductor, each of said first and second saturable capacitors having a ratio of unsaturated capacitance value to saturated capacitance value at least equal to 400, the unsaturated capacitance value of said first saturable capacitor being at least equal to 20 times the capacitance value of said second saturable capacitor, and the unsaturated capacitance value of said second saturable capacitor being at least equal to 20 times the saturated capacitance value of said first saturable capacitor, and a load impedance coupled to said second saturable capacitor for deriving energy pulses.

12. In combination a source of alternating voltage of a given frequency, a load circuit, a circuit resonant to the frequency of said source, means comprising said resonant circuit for connecting said source to said load circuit for providing a current flow from said source to said load circuit, a saturable capacitor, means for connecting said saturable capacitor across said load circuit, said capacitor having a dielectric adapted to saturate abruptly at a predetermined current value in the resonant circuit to alter said current flow and thereby cause a voltage pulse to be generated in said load circuit.

13. A circuit arrangement for generating a pulse waveform voltage from a voltage of oscillatory waveform available from a source, comprising a load circuit, a series resonant circuit for applying said voltage to said load circuit, a saturable capacitor connected across said load circuit, said capacitor having a dielectric adapted to saturate abruptly, substantially at a maximum current value in the resonant circuit, thereby to abruptly and substantially alter the current from the source to the load circuit.

14. A source of oscillatory voltage, a load circuit connected to said source to be energized, a saturable capacitor having a characteristic curve of dielectric charge density versus applied voltage which changes abruptly and reversibly at a given amplitude of applied voltage, a circuit connecting said capacitor across said load circuit, said capacitor responsive to said given amplitude of voltage developed in said connecting circuit to have its dielectric constant change abruptly and cause an abrupt and substantial alteration of current flow from said source to said load circuit, said alteration of current flow generating a pulse waveform in said load circuit.

References Cited in the file of this patent

UNITED STATES PATENTS

| Number | Name | Date |
|---|---|---|
| 2,443,094 | Carlson et al. | June 8, 1948 |
| 2,470,893 | Hepp | May 24, 1949 |